Aug. 28, 1945.  C. N. CROSS  2,383,776
DISPLAY MOUNT SUPPORT
Filed Oct. 14, 1942   2 Sheets-Sheet 1
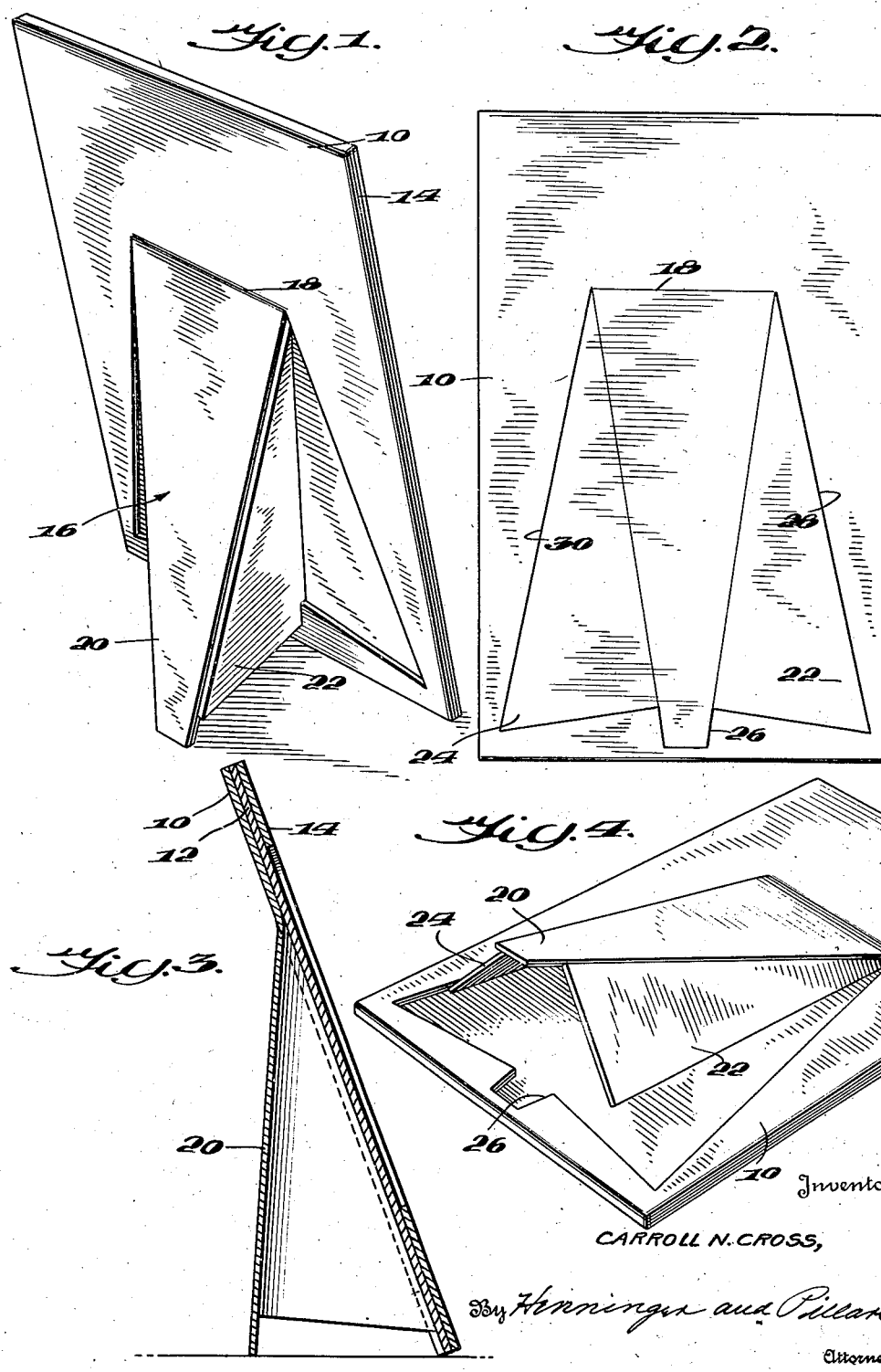
Inventor
CARROLL N. CROSS,
By Henninger and Pillars
Attorney

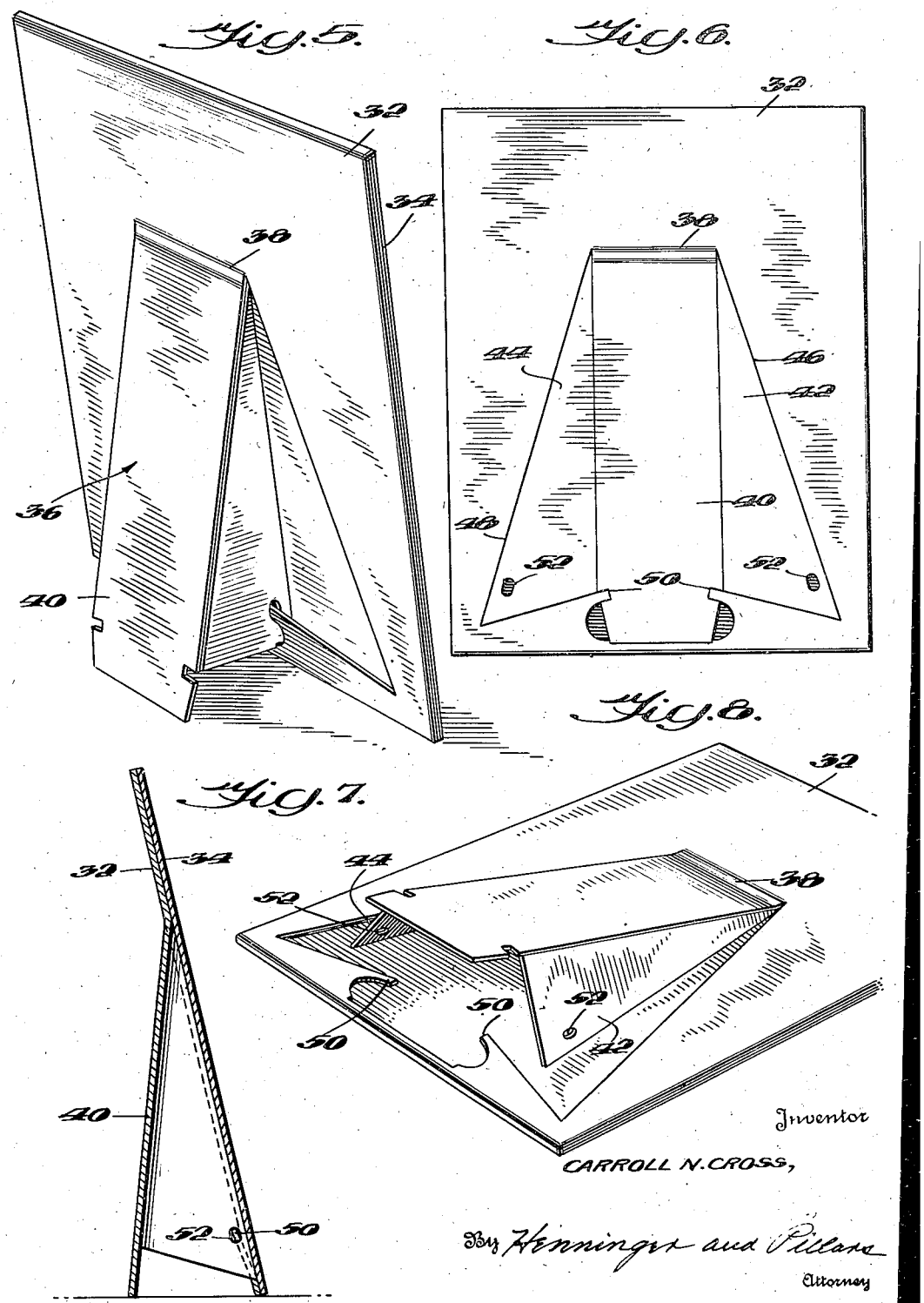

Patented Aug. 28, 1945

2,383,776

UNITED STATES PATENT OFFICE 2,383,776

DISPLAY MOUNT SUPPORT

Carroll N. Cross, Middleboro, Mass.

Application October 14, 1942, Serial No. 461,981

9 Claims. (Cl. 40—152.1)

This invention relates to display mounts and more particularly to a display mount having an easel or supporting structure adapted to support the mount in indicia-displaying position.

Heretofore display mounts have embodied supporting easel devices but these previous mounts have been of a construction that has involved the use of rivets and other metallic parts. The primary purpose of this invention is to provide a display mount easel construction that entirely eliminates the use of rivets, metallic stitching or other metallic elements.

In its most particular aspect the invention includes a back board, a face board, a mount supporting easel member that includes a supporting prop formed in the back board for angular movement about a line integrally joining the back board and the easel at one end of the easel, the construction being such as to permit the supporting easel to lie in the plane of the back board when the easel is in inoperative position. The easel construction includes a supporting prop that has formed therewith inwardly bendable wings that extend laterally from the supporting prop, the outer edge of the wings being adapted to contact the face board in mount supporting position. In addition to these features, the invention also contemplates means for interengaging the easel construction with a portion of the back board to maintain the easel in mount supporting position.

The invention will be more fully understood from a reading of the following description with regard to the accompanying drawings in which like reference numerals indicate like parts and in which:

Figure 1 is a perspective view of a display mount embodying the invention;

Figure 2 is a rear elevational view;

Figure 3 is a cross sectional view along the longitudinal center line of the mount;

Figure 4 is a perspective view showing the supporting easel in somewhat extended position;

Figure 5 is a perspective view of a modified form of the invention;

Figure 6 is a rear elevational view of the modified form of the invention;

Figure 7 is a cross sectional view of the modified construction taken on the longitudinal center line of the mount; and Figure 8 is a perspective view of the modified form of the invention showing the supporting easel in somewhat extended position.

The display mount construction shown in Figures 1 through 4 includes a back board 10, a face board 12 which may be surmounted by a windowed facial member 14 if desired. The mount-supporting easel member 16 is formed in the back board 10 for angular movement about score lines 18 at one end of the easel. Herein a line along which the mount-supporting easel 16 is integrally joined to the back board is shown as extending transversely across the top of the easel member. It will be noted that the mount supporting easel member 16 is adapted to lie in the plane of the back board 10 when the same is in inoperative position, the recessed position of the easel being most clearly shown in Figure 2 of the drawings.

The mount-supporting easel member 16 includes a supporting prop 20 which in the first embodiment of the invention is illustrated as being in the form of an inverted triangle. Attached to the lateral edges of the prop 20 are laterally extending wing sections 22 and 24, herein illustrated as being of triangular form and with the base of each thereof near the bottom of the easel. The wing members 22 and 24 extend substantially along the entire length of the prop member 20. The triangular form of the wing sections 22 and 24 permits their outer edges to contact the rear surface of the face board 12 and thereby provide support for the mount throughout substantially their entire lengths.

In order to maintain the easel in mount supporting position there is provided means in the back board at the free end of the easel that is engageable by the wing members 22 and 24 and effective to maintain the easel in its extended position. In the first embodiment of the invention this means is illustrated as consisting of a notch 26 located at the bottom edge of the back board 10. With this construction it is possible to move the supporting prop 20 angularly about the score lines 18, bend the wing members 22 and 24 rearwardly so that their outer edges 28 and 30 engage the rear surface of the face board 12 and the bottom corners thereof engage the upwardly extending notch 26. The construction provides a display mount support that is extremely simple in construction and very rigid in operation.

The form of the invention shown in Figures 5 through 8 includes a back board 32, a face board 34, and a mount-supporting easel 36. The mount-supporting easel 36 is formed in the back board 32 for angular movement about score lines 38 at one end of the easel. Herein a line along which the mount-supporting easel 36 is integrally joined to the back board is shown as extending transversely across the top of the easel member. The mount-supporting easel member 36 is adapted to lie in the plane of the back board 10 when the same is in inoperative position, the recessed position of the easel being most clearly shown in Figure 6 of the drawings.

The mount-supporting easel member 36 includes a supporting prop 40 which in this embodiment of the invention is illustrated as being in the form of a rectangle. Attached to the lateral edges of the prop 40 are laterally extending wing sections 42 and 44, herein illustrated as being of triangular form and with the base of each thereof near the bottom of the easel. The wing members 42 and 44 extend substantially along the entire length of the prop 40. The triangular form of the wing sections 42 and 44 permits their outer edges 46 and 48 to contact the rear surface of the face board 34 and thereby provide support for the mount throughout substantially their entire lengths.

In order to maintain the easel in mount-supporting position there is provided means in the back board at the free end of the easel that is engageable with the wing members 42 and 44 and effective to maintain the easel in its extended position. In the modified embodiment of the invention this means is illustrated as consisting of a pair of tongues 50 located at the bottom edge of the back board 32. The tongues 50 are adapted to engage passages 52 at the lower corners of each wing section 42 and 44. With this construction it is possible to move the supporting prop 40 angularly about the score line 38, bend the wing members 42 and 44 rearwardly so that their outer edges 46 and 48 engage the rear surface of the face board 34 and wherein the tongues 50 engage in the passages 52 to lock the mount-supporting easel in extended position. This construction provides a display mount support that is extremely simple in construction and rigid in operation.

The term "face board" as used in this description and in the claims is understood to mean the mount element on the face of the back board, whether that board is in fact visible from the front of the mount or constitutes an underlying element.

Two forms of the invention have been disclosed for the purpose of illustrating the manner in which the principles of the invention may be applied and these specific disclosures are not intended as limitations on the scope of the following claims.

I claim:

1. In a display mount, a back board, a mount supporting easel member including a supporting prop formed in said back board for angular movement about a line joining said back board and said easel at one end of said easel and being adapted to lie in the plane of said back board when in inoperative position, inwardly bendable wings extending laterally from said supporting prop, and an upwardly extending notch at the bottom of said back board engageable by said wings to maintain said easel in mount supporting position.

2. In a display amount, a back board, a face board, a mount supporting easel member including a supporting prop formed in said back board for angular movement about a line joining said back board and easel at one end of said easel and being adapted to lie in the plane of said back board when in inoperative position, inwardly bendable wings extending laterally from said supporting prop, the outer edges of said wings being adapted to contact said face board in mount supporting position, and an upwardly extending notch at the bottom of said back board engageable by said wings to maintain said easel in mount supporting position.

3. In a display mount, a back board, a face board, a mount supporting easel member including a supporting prop formed in said back board for angular movement about a line joining said back board and easel at one end of said easel and being adapted to lie in the plane of said back board when in inoperative position, inwardly bendable triangular wings extending laterally from each side of said supporting prop along substantially the entire length thereof, the outer edges of said wings being adapted to contact said face board in mount supporting position, and an upwardly extending notch at the bottom edge of said back board engageable by the lower portion of said wings to maintain said easel in mount supporting position.

4. In a display mount, a back board, a mount supporting easel member including a supporting prop formed in said back board for angular movement about a line joining said back board and said easel at one end of said easel and being adapted to lie in the plane of said back board when in inoperative position, inwardly bendable wings extending laterally from said supporting prop, a passage at the free end of each wing, and a notch having formed therein tongues at the bottom of said back board engageable in said passages to maintain said easel in mount supporting position.

5. In a display mount, a back board, a face board, a mount supporting easel member including a supporting prop formed in said back board for angular movement about a line joining said back board and easel at one end of said easel and being adapted to lie in the plane of said back board when in inoperative position, inwardly bendable wings extending laterally from said supporting prop, the outer edges of said wings being adapted to contact said face board in mount supporting position, a passage at the free end of each wing, and a notch having formed therein tongues at the bottom of said back board engageable in said passages to maintain said easel in mount supporting position.

6. In a display mount, a back board, a face board, a mount supporting easel member including a supporting prop formed in said back board for angular movement about a line joining said back board and easel at one end of said easel and being adapted to lie in the plane of said back board when in inoperative position, inwardly bendable triangular wings extending laterally from each side of said supporting prop along substantially the entire length thereof, the outer edges of said wings being adapted to contact said face board in mount supporting position, a passage at the free end of said wings, and a notch having formed therein tongues at the bottom edge of said back board engageable in said passages to maintain said easel in mount supporting position.

7. In a display mount, a back board, a mount-supporting easel member including a body formed in said back board for angular movement about one end thereof and being adapted to lie in the plane of said back board when in inoperative position, inwardly bendable wings extending laterally from said body, and a notch formed in said back board at the free end of said easel engageable by said wings to maintain said easel in mount-supporting position.

8. In a display mount, a back board, a mount-supporting easel member including a supporting prop formed in said back board for angular movement about a line integrally joining said back board and said easel at one end of said easel and being adapted to lie in the plane of said back board when in inoperative position, inwardly bendable wings extending laterally from said supporting prop, and a notch at the free end of said mount-supporting easel opening into the area of the back board from which said easel is cut, said notch being engageable by said wings to maintain said easel in mount-supporting position.

9. In a display mount, a back board, a mount-supporting easel member including a supporting prop formed in said back board for angular movement about a line integrally joining said back board and said easel at one end of said easel and being adapted to lie entirely within the plane of said back board when in inoperative position, an inwardly bendable wing carried at one edge of said supporting prop and extending laterally therefrom, and an inwardly opening notch in said back board at the free end of said supporting prop, whereby said notch may be engaged by said wing when angularly disposed with respect to said prop to maintain said easel in mount-supporting position.

CARROLL N. CROSS.